US008891095B2

(12) United States Patent
Fujiki et al.

(10) Patent No.: US 8,891,095 B2
(45) Date of Patent: Nov. 18, 2014

(54) IMAGE FORMING SYSTEM AND IMAGE FORMING APPARATUS (75) Inventors: Daisuke Fujiki, Osaka (JP); Toshiyuki Taniuchi, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 11 days.

(21) Appl. No.: 13/702,889

(22) PCT Filed: Apr. 26, 2011

(86) PCT No.: PCT/JP2011/060132
§ 371 (c)(1),
(2), (4) Date: Dec. 7, 2012

(87) PCT Pub. No.: WO2011/155274
PCT Pub. Date: Dec. 15, 2011

(65) Prior Publication Data
US 2013/0083346 A1   Apr. 4, 2013

(30) Foreign Application Priority Data

Jun. 10, 2010   (JP) .................. 2010-132713

(51) Int. Cl.
*G06F 15/00* (2006.01)
*H04N 1/00* (2006.01)
*G06F 1/32* (2006.01)
*G03G 15/00* (2006.01)

(52) U.S. Cl.
CPC ....... *H04N 1/00891* (2013.01); *H04N 1/00222* (2013.01); *H04N 1/00344* (2013.01); *H04N 1/00896* (2013.01); *H04N 2201/0074* (2013.01); *H04N 2201/3274* (2013.01); *G06F 1/3231* (2013.01); *H04N 2201/0039* (2013.01); *G06F 1/3215* (2013.01); *G03G 15/5004* (2013.01); *H04N 2201/0094* (2013.01); *H04N 2201/3202* (2013.01); *G03G 15/5091* (2013.01)
USPC ........................................ 358/1.13

(58) Field of Classification Search
CPC .................................. H04N 1/00885
USPC ........................................ 358/1.13
See application file for complete search history.

(56) References Cited

U.S. PATENT DOCUMENTS

2007/0182998 A1* 8/2007 Okada .......................... 358/400
2008/0198397 A1   8/2008 Watanabe
2010/0235775 A1* 9/2010 Sugimoto ..................... 715/772

FOREIGN PATENT DOCUMENTS

| JP | 2006-340223 A | 12/2006 |
| JP | 2008-203704 A | 9/2008 |
| JP | 2008-205714 A | 9/2008 |
| JP | 2010-003083 A | 1/2010 |
| JP | 2010-056901 A | 3/2010 |
| JP | 2010-073018 A | 4/2010 |

* cited by examiner

*Primary Examiner* — Saeid Ebrahimi Dehkordy
(74) *Attorney, Agent, or Firm* — Birch, Stewart, Kolasch & Birch, LLP (57) ABSTRACT An image forming system contains a multifunctional printer that has a plurality of functional units and is capable of controlling transition to a power saving mode for each functional unit. Further, the image forming system includes personal computers and a server. The server, in the power saving mode, sets one or more functional units that are determined to be switched over to the power saving mode from among the plurality of functional units based on time entry, log-in states of users to the personal computers, and a history of past usage of the multifunctional printer.

6 Claims, 11 Drawing Sheets

| | 4/20(18-08) | 4/21(08-10) | 4/21(10-12) | 4/21(12-14) | 4/21(14-16) | 4/21(16-18) | 4/21(18-08) | 4/22(18-08) |
|---|---|---|---|---|---|---|---|---|
| USER A | C:02,S:00 P:15,F:00 | C:00,S:01 P:05,F:00 | C:02,S:01 P:05,F:00 | C:00,S:03 P:00,F:00 | C:02,S:00 P:10,F:00 | C:01,S:00 P:00,F:00 | C:00,S:00 P:20,F:00 | C:00,S:00 P:00,F:00 |
| USER B | C:02,S:00 P:25,F:00 | C:01,S:03 P:15,F:00 | C:03,S:01 P:12,F:00 | C:00,S:02 P:05,F:00 | C:02,S:00 P:20,F:00 | C:02,S:00 P:05,F:00 | C:03,S:00 P:25,F:00 | C:00,S:02 P:20,F:00 |
| USER C | C:04,S:00 P:15,F:00 | C:01,S:01 P:10,F:00 | C:01,S:03 P:05,F:00 | C:01,S:02 P:00,F:00 | C:02,S:00 P:10,F:00 | C:03,S:00 P:00,F:00 | C:00,S:00 P:05,F:00 | C:01,S:00 P:10,F:00 |
| USER D | C:00,S:02 P:05,F:00 | C:01,S:02 P:08,F:00 | C:05,S:00 P:10,F:00 | C:01,S:03 P:05,F:00 | C:01,S:01 P:00,F:00 | C:04,S:00 P:05,F:00 | C:00,S:01 P:05,F:00 | C:01,S:00 P:08,F:00 |
| USER E | C:10,S:01 P:20,F:00 | C:01,S:01 P:03,F:00 | C:01,S:03 P:10,F:01 | C:00,S:00 P:03,F:00 | C:00,S:02 P:00,F:00 | C:00,S:00 P:08,F:00 | C:00,S:01 P:10,F:01 | C:01,S:02 P:00,F:00 |
| USER F | C:15,S:01 P:00,F:01 | C:03,S:02 P:01,F:00 | C:10,S:02 P:00,F:00 | C:01,S:05 P:00,F:02 | C:03,S:02 P:12,F:00 | C:00,S:01 P:00,F:03 | C:00,S:01 P:10,F:01 | C:02,S:03 P:00,F:01 |
| USER G | C:00,S:01 P:00,F:01 | C:01,S:05 P:00,F:01 | C:05,S:05 P:00,F:03 | C:00,S:07 P:02,F:01 | C:00,S:02 P:00,F:01 | C:00,S:02 P:03,F:00 | C:10,S:02 P:10,F:00 | C:02,S:05 P:00,F:01 |

| | 4/22(10-12) | 4/21(10-12) | 4/20(10-12) | 4/19(10-12) | 4/18(10-12) | 4/17(10-12) | 4/16(10-12) | 4/15(10-12) |
|---|---|---|---|---|---|---|---|---|
| USER A | C:01,S:03 P:05,F:00 | C:02,S:01 P:05,F:00 | C:02,S:02 P:10,F:00 | C:05,S:05 P:15,F:00 | C:10,S:01 P:05,F:00 | C:02,S:01 P:06,F:00 | C:01,S:01 P:05,F:00 | C:02,S:01 P:05,F:00 |
| USER C | C:02,S:01 P:05,F:00 | C:01,S:03 P:05,F:00 | C:01,S:03 P:10,F:00 | C:01,S:00 P:05,F:00 | C:01,S:03 P:05,F:00 | C:01,S:03 P:04,F:00 | C:01,S:03 P:05,F:00 | C:01,S:03 P:05,F:00 |
| USER E | C:01,S:03 P:10,F:01 | C:01,S:03 P:10,F:01 | C:01,S:03 P:10,F:01 | C:01,S:01 P:00,F:01 | C:01,S:03 P:10,F:01 | C:01,S:03 P:10,F:01 | C:01,S:03 P:10,F:01 | C:01,S:03 P:10,F:01 |
| USER F | C:05,S:05 P:00,F:03 | C:10,S:02 P:00,F:00 | C:10,S:03 P:00,F:00 | C:10,S:02 P:00,F:00 | C:10,S:02 P:00,F:00 | C:10,S:02 P:00,F:03 | C:11,S:02 P:20,F:00 | C:10,S:02 P:00,F:00 |
| USER G | C:05,S:05 P:00,F:00 | C:05,S:05 P:00,F:03 | C:05,S:03 P:10,F:03 | C:02,S:05 P:00,F:03 | C:00,S:05 P:00,F:03 | C:05,S:05 P:00,F:00 | C:05,S:05 P:00,F:03 | C:05,S:05 P:00,F:03 |

FIG.7B

| | 4/16(10-12) | 4/09(10-12) | 4/02(10-12) | 3/26(10-12) | 3/19(10-12) | 3/12(10-12) | 3/5(10-12) | 2/26(10-12) |
|---|---|---|---|---|---|---|---|---|
| USER A | C:02,S:01 P:00,F:03 | C:01,S:01 P:00,F:00 | C:02,S:01 P:05,F:02 | C:00,S:01 P:05,F:00 | C:06,S:00 P:04,F:00 | C:07,S:01 P:05,F:00 | C:00,S:01 P:00,F:00 | C:02,S:01 P:05,F:00 |
| USER C | C:01,S:03 P:15,F:00 | C:01,S:03 P:00,F:00 | C:01,S:03 P:05,F:01 | C:01,S:03 P:05,F:00 | C:02,S:01 P:06,F:00 | C:01,S:06 P:05,F:00 | C:01,S:03 P:05,F:00 | C:01,S:03 P:05,F:00 |
| USER E | C:01,S:03 P:00,F:01 | C:02,S:03 P:10,F:01 | C:01,S:03 P:10,F:01 | C:01,S:03 P:10,F:01 | C:01,S:00 P:10,F:00 | C:06,S:00 P:10,F:01 | C:03,S:03 P:10,F:01 | C:01,S:03 P:10,F:01 |
| USER F | C:10,S:02 P:10,F:00 | C:10,S:02 P:00,F:00 | C:10,S:02 P:00,F:00 | C:10,S:02 P:00,F:00 | C:05,S:03 P:10,F:00 | C:10,S:02 P:00,F:00 | C:10,S:02 P:00,F:00 | C:10,S:02 P:00,F:00 |
| USER G | C:05,S:05 P:00,F:00 | C:05,S:05 P:00,F:03 | C:05,S:05 P:00,F:00 | C:07,S:05 P:00,F:03 | C:05,S:05 P:00,F:03 | C:05,S:05 P:00,F:03 | C:05,S:05 P:05,F:03 | C:05,S:05 P:00,F:03 |

FIG.8

| FUNCTION | COPY FUNCTION | | SCANNER FUNCTION | | PRINT FUNCTION | | FAX FUNCTION | |
|---|---|---|---|---|---|---|---|---|
| | PAST MEAN NUMBER OF SHEETS | SETTINGS IN POWER-SAVING | PAST MEAN NUMBER OF SHEETS | SETTINGS IN POWER-SAVING | PAST MEAN NUMBER OF SHEETS | SETTINGS IN POWER-SAVING | PAST MEAN NUMBER OF SHEETS | SETTINGS IN POWER-SAVING |
| 4/23 (08-10) | 5 SHEETS | OFF | 13 SHEETS | OFF | 38 SHEETS | ON | 1 SHEETS | OFF |
| 4/23 (10-12) | 25 SHEETS | ON | 15 SHEETS | ON | 22 SHEETS | OFF | 4 SHEETS | OFF |
| 4/23 (12-14) | 2 SHEETS | OFF | 22 SHEETS | ON | 15 SHEETS | OFF | 3 SHEETS | OFF |
| 4/23 (14-16) | 10 SHEETS | ON | 9 SHEETS | OFF | 55 SHEETS | ON | 1 SHEETS | OFF |
| 4/23 (16-18) | 18 SHEETS | ON | 3 SHEETS | OFF | 13 SHEETS | OFF | 6 SHEETS | ON |
| 4/23 (18-08) | 33 SHEETS | ON | 5 SHEETS | OFF | 80 SHEETS | ON | 2 SHEETS | OFF |

THRESHOLD VALUE FOR MEAN NUMBER OF SHEETS   COPY : 10 SHEETS ,   SCANNER : 15 SHEETS ,   PRINT : 30 SHEETS ,   FAX : 5 SHEETS

FIG.9

| | DORMANCY STATUS OF MFP FUNCTIONS | | | | DORMANCY STATUS OF POWER SUPPLY FOR EACH UNIT | | | |
|---|---|---|---|---|---|---|---|---|
| PATTERN | COPY | SCAN | PRINT | FAX | SCANNER UNIT | IMAGE FORMING UNIT | OPERATION PANEL UNIT | FAX UNIT |
| 1 | ON | ON | ON | ON | ON | ON | ON | ON |
| 2 | ON | ON | ON | OFF | ON | ON | ON | OFF |
| 3 | ON | ON | OFF | ON | ON | ON | ON | ON |
| 4 | ON | OFF | ON | ON | ON | ON | ON | ON |
| 5 | OFF | ON | ON | ON | ON | ON | ON | ON |
| 6 | OFF | OFF | ON | ON | OFF | ON | ON | ON |
| 7 | OFF | ON | ON | OFF | ON | ON | ON | OFF |
| 8 | ON | OFF | OFF | OFF | ON | OFF | ON | OFF |
| 9 | ON | ON | OFF | OFF | ON | ON | ON | OFF |
| 10 | ON | OFF | ON | OFF | ON | ON | ON | OFF |
| 11 | ON | ON | OFF | OFF | ON | ON | ON | OFF |
| 12 | ON | OFF | ON | ON | ON | ON | ON | OFF |
| 13 | OFF | OFF | OFF | OFF | OFF | OFF | ON | OFF |
| 14 | OFF | OFF | OFF | OFF | OFF | ON | OFF | OFF |
| 15 | OFF | OFF | OFF | ON | OFF | OFF | OFF | ON |
| 16 | OFF | OFF | OFF | OFF | OFF | OFF | OFF | OFF |

IMAGE FORMING SYSTEM AND IMAGE FORMING APPARATUS

TECHNICAL FIELD

The present invention relates to an image forming system containing an image forming apparatus and to the image forming apparatus that has a plurality of functional units and is capable of controlling transition to a power saving mode for each functional unit while being in a power saving mode.

BACKGROUND ART

Among image forming apparatus is there a multifunctional printer comprising a plurality of functional units such as image forming unit, scanner unit, fax unit, operation panel and so forth.

Among those multifunctional printers is there one that is configured so as to switch over to a power saving mode when there is no job entry for a certain period of time in order to reduce its power consumption while being kept on standby.

Then among such multifunctional printers, in order to further improve a power saving effect, there is one that is configured so as to switch over respective functional units to a power saving mode sequentially in a pre-set order (for example, refer to Patent Literature 1), and there is another one that is configured so as to start feeding the electricity only to necessary functional unit(s) when a job occurs during the power saving mode (for example, refer to Patent Literature 2).

CITATION LIST

Patent Literature

[Patent Literature 1]
Japanese Patent Unexamined Publication No. 2008-203704 bulletin
[Patent Literature 2]
Japanese Patent Unexamined Publication No. 2008-205714 bulletin

SUMMARY OF INVENTION

Technical Problem

However, while the power consumption during the standby decreases by the transition to the power saving mode, such transition to the power saving mode as is more than required results in posing a risk of deteriorating the convenience of users such as the occurrence of a waiting time at the time of job entry and so forth. For example, when a functional unit that is expected to be used with a high probability is caused to switch over to the power saving mode, a response time to return to a normal mode occurs if a job entry from a user is made, thereby increasing the risk of deteriorating the convenience of the user.

On the other hand, when a functional unit that is not used with a high probability is not caused to switch over to the power saving mode, useless power consumption occurs, thereby increasing the likelihood that a power saving effect attainable by the mode switching decreases. For this reason, it can be said to be preferable that controlling the transition to the power saving mode is performed in consideration of both the convenience of the users and the power saving effect during the standby.

The present invention is directed to providing an image forming system and an image forming apparatus capable of performing a control of the feed of electricity to each functional unit of an image forming apparatus without deteriorating the convenience of users nor decreasing the power saving effect.

Solution to Problem

An image forming system according to the present invention contains an image forming apparatus that has a plurality of functional units and is capable of controlling transition to a power saving mode for each functional unit while being in a power saving mode.

The image forming system includes an operation terminal unit, an operating means, a history information recording section, a state administering section and a power feed control section.

The operation terminal unit has an authentication function, and is configured so as to be capable of outputting a job run command to the functional units based on an operation of a user permitted to log in through the authentication. Example of the operation terminal unit includes a personal computer. Here, for the operation terminal unit, a plurality them are installed as a general rule; however, even a single operation terminal unit can also exploit the technical idea of the present invention.

The operating means is installed in the image forming apparatus. The operating means has an authentication function, and is configured so as to be capable of outputting a job run command to the functional units based on an operation of a user permitted to log in through the authentication.

The history information recording section is configured so as to record a job history of the plurality of functional units associating the job history with users who caused respective job run commands to be outputted. The state administering section is configured so as to administer log-in states at the operation terminal units.

The power feed control section sets one or more functional units that are determined to be switched over to a power saving mode from among the plurality of functional units based on time entry, the log-in states and recorded content of the history information recording section. For example, based on a job history in a plurality of days associated with all of users who are logging in and in the same time zone as the current log-in, the power feed control section performs a control to cause each of the functional units of which mean value of the number of jobs within the time zone does not reach a predetermined value to switch over to the power saving mode.

This configuration allows for performing a control such that any functional unit that is not expected to be used with a high probability is caused to switch over to the power saving mode while any other functional unit that is expected to be used with a high probability is not caused to switch over to the power saving mode, based on a history of past usage of the image forming apparatus by the users currently logging in.

Therefore, frequent occurrences of the inconvenience that a time loss occurs because a functional unit the user is going to use has been switched over to the power saving mode and the inconvenience that any other functional unit the users are not using is left without being switched over to the power saving mode can be prevented surely.

Even when an image forming apparatus is configured with a means of communications communicable with the above-mentioned operation terminal unit together with the above-mentioned operating means, the above-mentioned history information recording section, the above-mentioned state administering section and the above-mentioned power feed control section, the same functional effects can be achieved as the above-mentioned image forming system.

Advantageous Effects of Invention

The present invention makes it possible to perform a control of the feed of electricity to each functional unit of an image forming apparatus without deteriorating the convenience of users nor decreasing the power saving effect.

BRIEF DESCRIPTION OF DRAWINGS

FIG. 7 is a diagram showing an example of a piece of history-of-usage information that is referred to.

DESCRIPTION OF EMBODIMENTS

Figure 1:
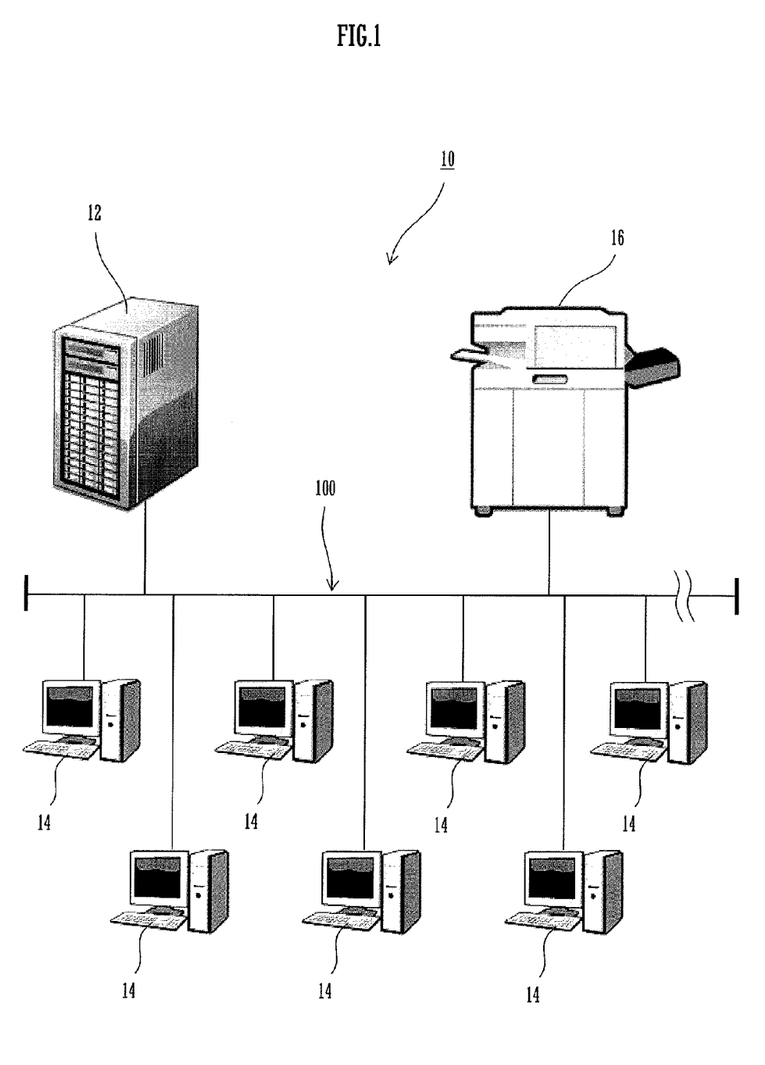
FIG. 1 is a diagram showing an outline of an image forming system according to an embodiment of the present invention.
Figure 2:
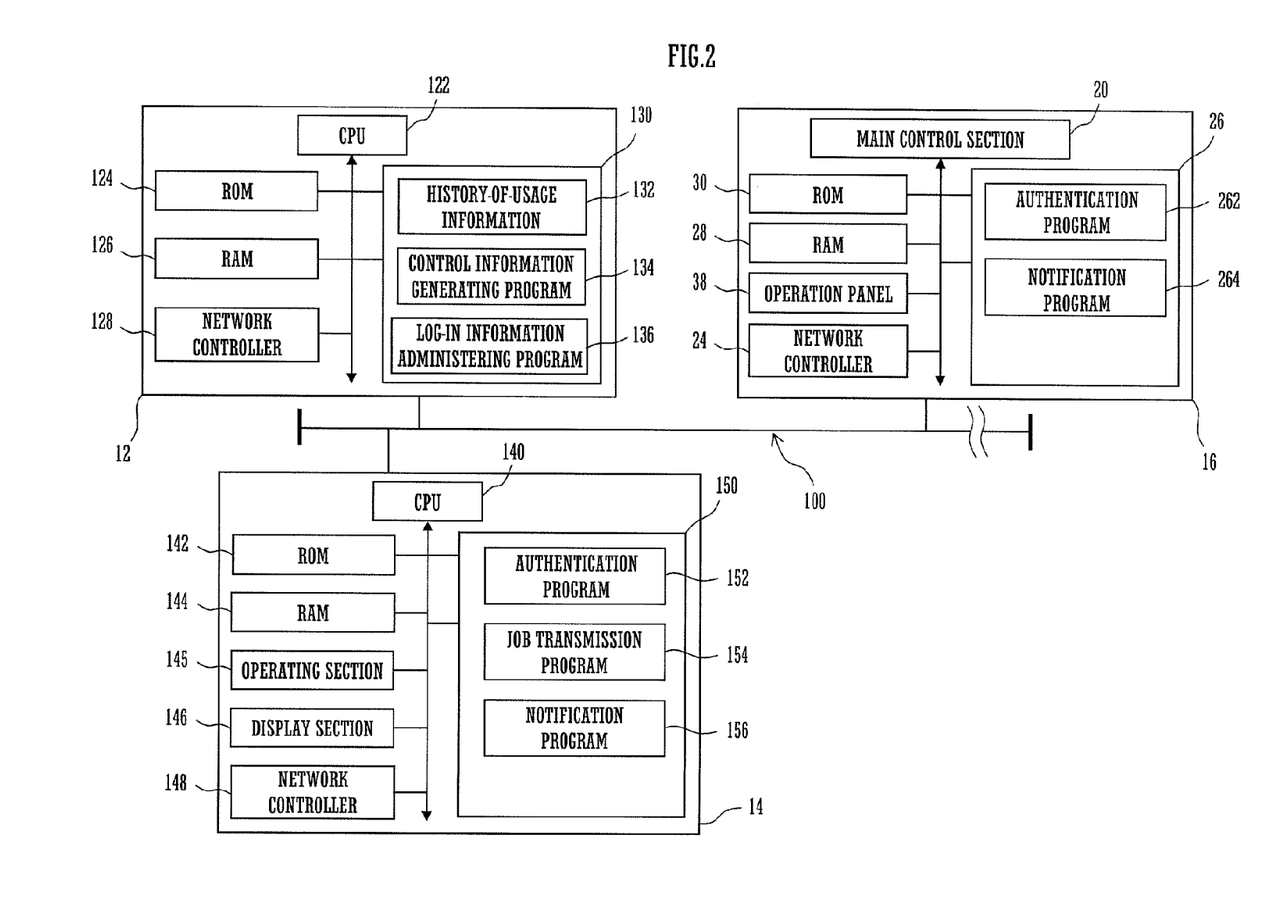
FIG. 2 is a block diagram showing an outline of the image forming system.

Using FIG. 1 and FIG. 2, an outline of an image forming system according to an embodiment of the present invention is explained.

An image forming system 10 includes a network (for example, Local Area Network) 100, a server 12, a plurality of personal computers 14 and a multifunctional printer 16 that are respectively connected to the network 100.

The server 12 is configured so as to administer log-in states of users to the image forming system 10. Besides, the server 12 is configured so as to record history information indicating what kind of jobs the users who logged in carried out in the image forming system 10.

In concrete terms, the server 12 includes a CPU 122, a ROM 124, a RAM 126, a network controller 128 and a recording section 130 such as hard disk and/or the like. The recording section 130 stores history-of-usage information 132, a control information generating program 134, and a log-in information administering program 136.

The history-of-usage information 132 is information concerning a history of usage in a past predetermined number of days by each user that indicates when which user caused which functional unit to perform how much amount of a job. The server 12 records, in the recording section 130, the history-of-usage information that is usually supplied from the personal computers 14 and the multifunctional printer 16 associating the information with respective users.

The control information generating program 134 is the one to pick out a piece of the history-of-usage information relating to a time zone and log-in states at a certain time from among pieces of history-of-usage information, and then to produce information for an on-off control of each functional unit of the multifunctional printer 16. The log-in information administering program 136 is the one to watch the log-in information on each personal computer 14 in order to determine which users of the image forming system 10 are likely to use the multifunctional printer 16. In the server 12, an integrated control is performed by the CPU 122's reading out a plurality of programs and data stored in the ROM 124 and the recording section 130.

The personal computers 14 each function as a client computer in the image forming system 10. The personal computer 14 includes a CPU 140, a ROM 142, a RAM 144, an operating section 145, a display section 146, a network controller 148 and a recording section 150 such as hard disk and/or the like.

The recording section 150 includes an authentication program 152, a job transmission program 154 and a notification program 156. The authentication program 152 is the one to have the personal computer 14 bear an authentication function. The job transmission program 154 is the one to have the personal computer bear a function to cause a job run command to each functional unit of the multifunctional printer 16 to be outputted based on an operation of a user permitted to log in through the authentication. The notification program 156 is the one to notify the server 12 to the effect that a user logged in or logged out when it happened, and to transmit information on the history of usage (user name concerning a current job run, kind of job, time, number of sheets used, files used) to the server 12 when the job transmission (a print job) to the multifunctional printer 16 was made from the personal computer 14.

The multifunctional printer 16 includes a main control section 20, a ROM 30, a RAM 28, an operation panel 38, a network controller 24 and a recording section 26 such as hard disk and/or the like. To the recording section 26 are stored an authentication program 262 and a notification program 264 that are the same as the above-mentioned authentication program 152 and the notification program 156, respectively.

In the multifunctional printer 16, only the user permitted to log in through the authentication is allowed to carry out an operation for a copy, a fax (transmission, reception printing) and a scan, and information on the history of usage (user name concerning a current job run, kind of job, time, number of sheets used, file(s) used) is transmitted to the server 12.

Figure 3:
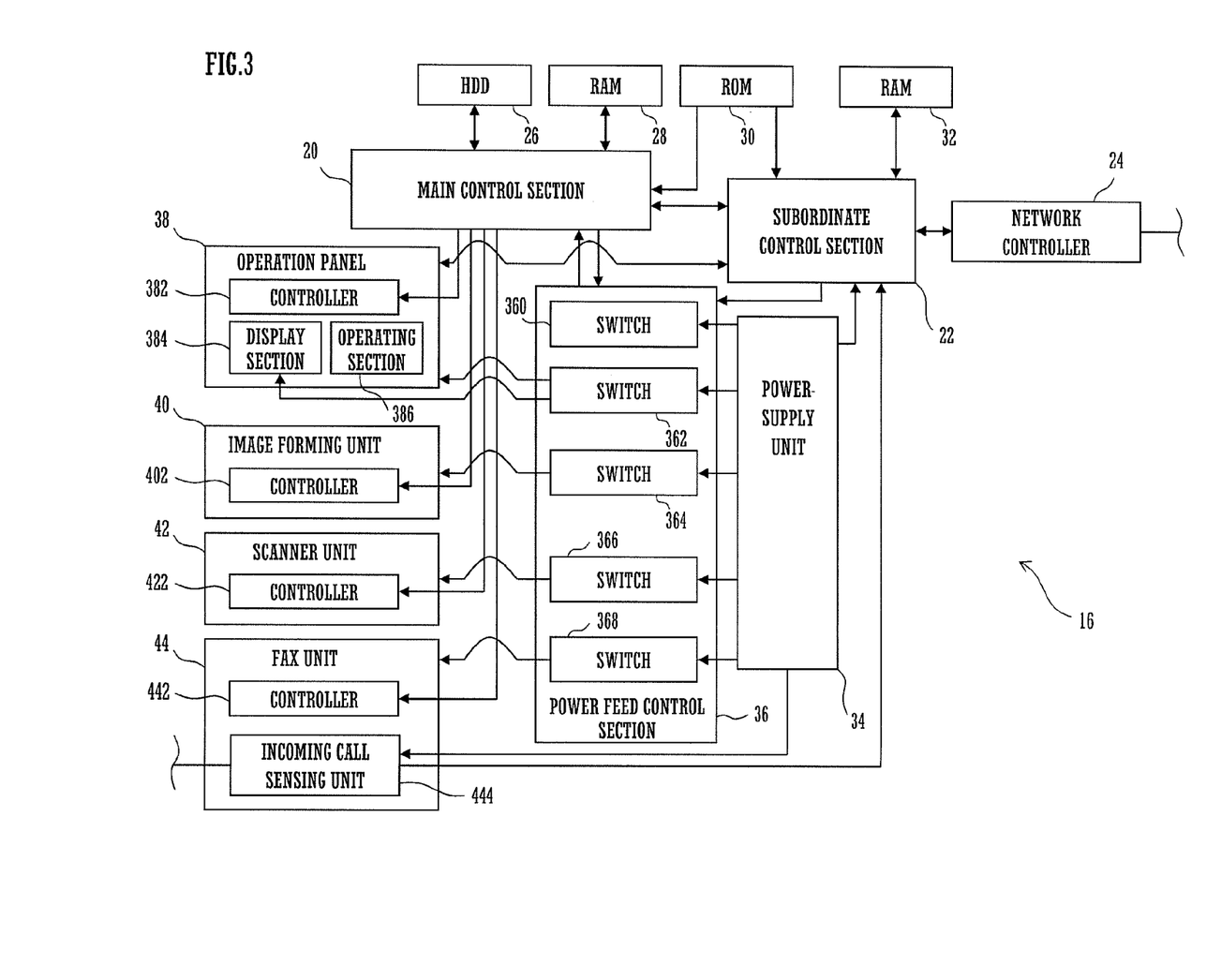
FIG. 3 is a block diagram showing an outline of a multifunctional printer.

The multifunctional printer 16 includes, as shown in FIG. 3, the operation panel 38, an image forming unit 40, a scanner unit 42, a fax unit 44, a power-supply unit 34, a power feed control section 36, a main control section 20 and a subordinate control section 22.

The operation panel 38, which corresponds to an operating means of the present invention, has an authentication function, and is configured so as to output a job run command to each functional unit based on an operation of the user permitted to log in through the authentication. The operation panel 38 includes a display section 384, an operating section 386 and a controller 382. The display section 384 is configured in such a manner as to display directions, warning and so forth to the user and as to display image data to be printed. The operating section 386 is configured so as to accept inputs of a job entry operation and a job setting operation by the user. Moreover, the operating section 386 is configured so as to accept authentication information on a user directly operating the multifunctional printer 16. Means to accept the authentication information on the user includes a card reader capable of reading an IC card of the user, and/or operation keys accepting an input of a user ID and/or a password of the user. The controller 382 is configured so as to control a functioning of the operation panel 38.

The image forming unit 40 includes a photoreceptor, an electrostatic charger, an exposure device, a developing device, a transfer device, a fuser unit, a transport mechanism and so on, and is configured so as to perform an image forming process onto a paper sheet in accordance with the electrophotography method. In addition, the image forming unit 40 includes a controller 402 configured so as to control an operation of each section.

The scanner unit 42 includes an automated document conveying is device, a document reader, and a controller 422 configured so as to control operations of the former two.

The fax unit 44 is connected to the telephone network, and includes a fax communication facility. The fax unit 44 includes an incoming call sensing unit 444 and a controller 442 to control an operation of each section.

The power-supply unit 34 is configured so as to supply the electric power to each section of the multifunctional printer 16 through the power feed control section 36. The power feed control section 36 is configured so as to control a state of electricity feeding to each section of the multifunctional printer 16.

The power feed control section 36 includes a plurality of switches 360, 362, 364, 366 and 368. Example of the switches 360, 362, 364, 366 and 368 includes a field effect transistor; however, the switches 360, 362, 364, 366 and 368 can be configured using transistors of other kinds and/or other circuit elements.

The main control section 20 is connected to a hard disk 26, the RAM 28 and the ROM 30, and is configured so as to perform an integrated control of an operation of the multifunctional printer 16 based on programs stored in the ROM 30. In the embodiment, the main control section 20 is pre-set to suspend operation thereof in is a power saving mode.

The subordinate control section 22 is connected to the ROM 30 and a RAM 32, and is configured so as to control the operation of the multifunctional printer 16 collaborating with the main control section 20 in a normal mode, and so as to control the operation of the multifunctional printer 16 by itself in the power saving mode. The subordinate control section 22 is connected to the network controller 24 that is configured so as to control communications with other instruments on the network 100.

Figure 4:
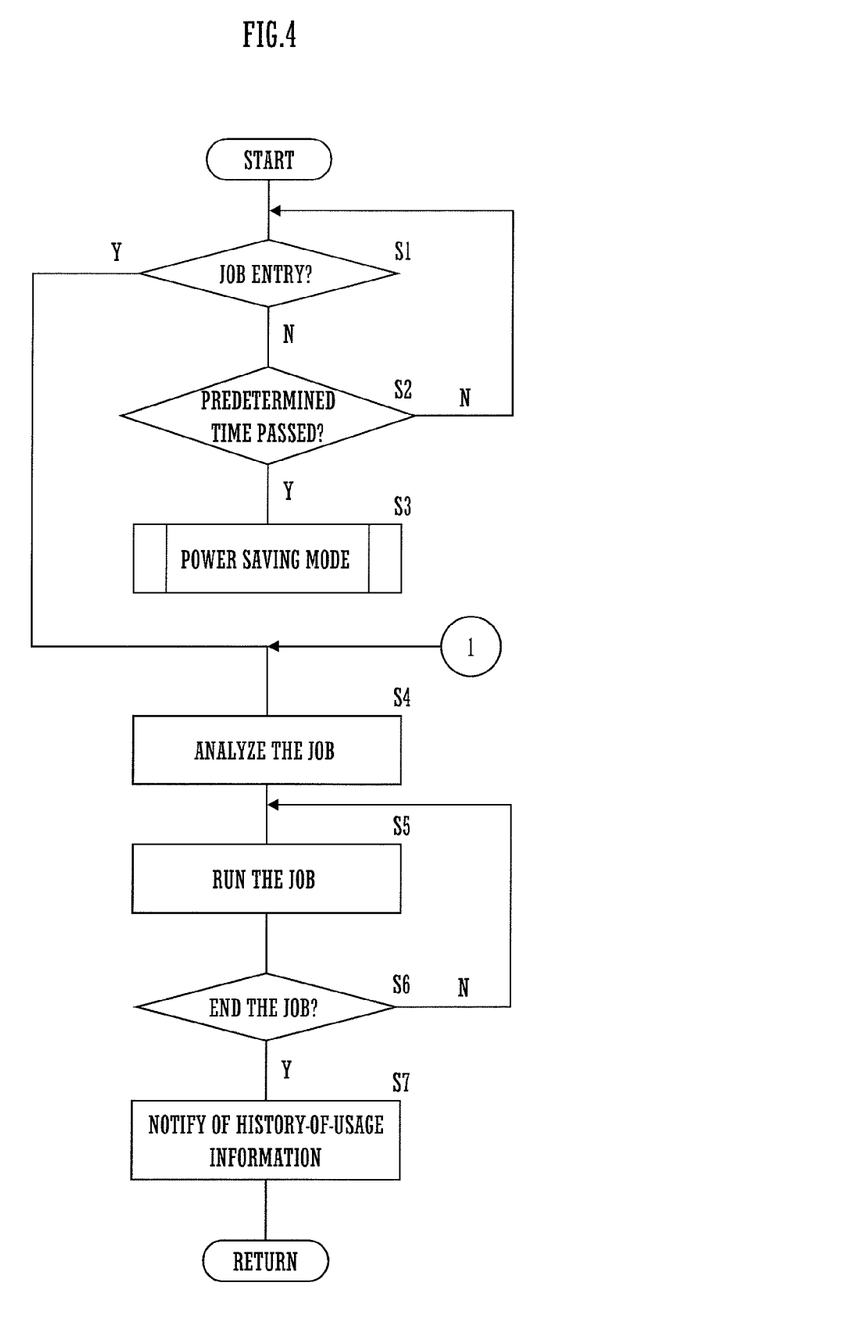
FIG. 4 is a flowchart showing an example of an operational procedure for the multifunctional printer in a normal mode.

Here, using FIG. 4, an example of an operational procedure for the main control section 20 of the multifunctional printer 16 in the normal mode is explained. As shown in FIG. 4, in the normal mode, the main control section 20 waits until a job entry is made (S1).

If there is a job entry in the waiting step of S1, the main control section 20 analyzes the content of the job (S4), and based on a result of the analysis, causes the job to be performed using the functional units that are necessary (S5).

After that, the main control section 20 determines whether the job is finished or not (S6), and if not finished yet, returns back to the step of S5. On the other hand, if the job is finished in the decision step of S6, the main control section 20 causes the history-of-usage information to be updated by adding information on the current job (user name, job start date and time, job finish date and time, kind of job, number of sheets used, etc.) to the history-of-usage information (S7), and then returns to the waiting step of S1.

Figure 5:
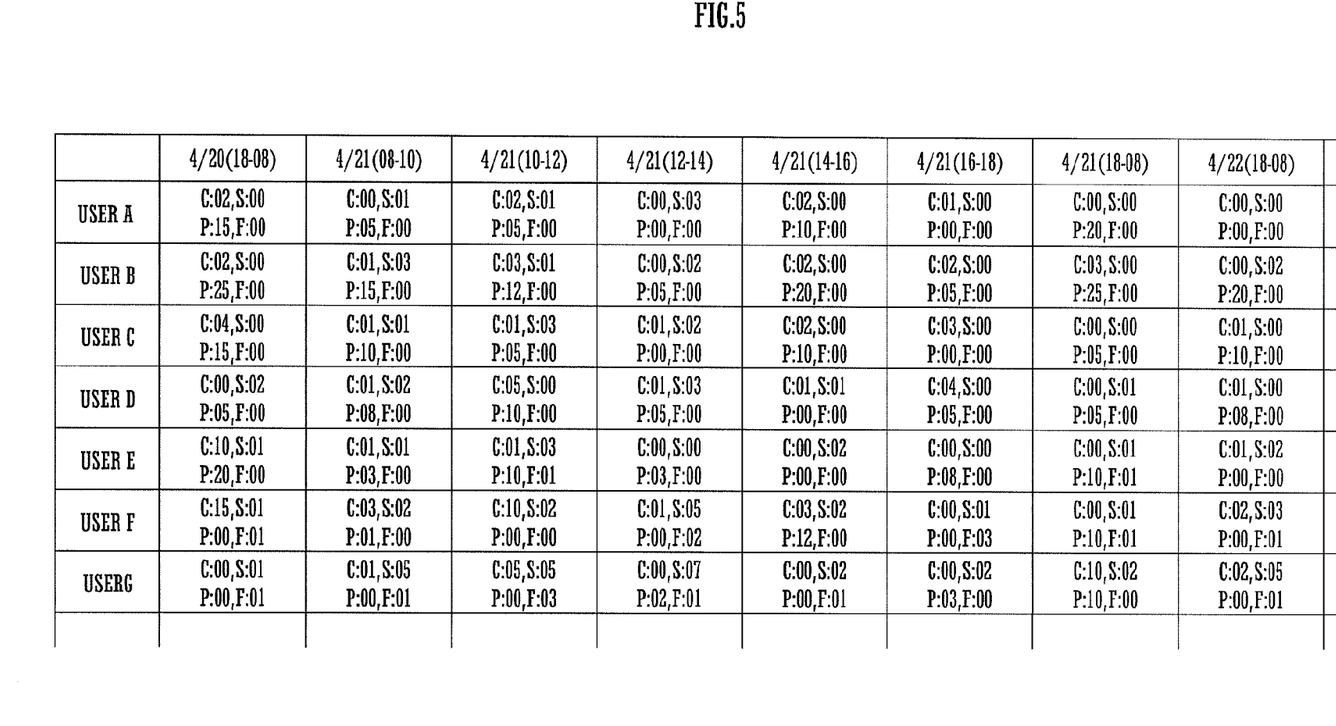
FIG. 5 is a diagram showing an example of a piece of history-of-usage information that a server records.

Now, using FIG. 5, the history-of-usage information is briefly explained. The history-of-usage information indicates to what degree each user used each function (copy function, print function, scanner function, fax function) of the multifunctional printer 16 in each preset time zone. In the embodiment, a day is divided into six time zones consisting of 8:00-10:00, 10:00-12:00, 12:00-14:00, 14:00-16:00, 16:00-18:00, then from 18:00 until 8:00 on the next morning, and it is configured so as to record that how many times (together with the number of sheets processed) each user used the copy function (C), the print function (P), the scanner function (S) and the fax function (F) in each time zone.

For example, in the time zone from 8:00 to 10:00 a.m. of April 21, it can be found that the user A used the copy function (C) 0 time, print function (P) 5 times, the scanner function (S) 1 time, and the fax function (F) 0 time. Likewise, in the same time zone of the same day, it can be found that the user B used the copy function (C) 1 time, the print function (P) 15 times, the scanner function (S) 3 times, and the fax function (F) 0 time.

If there is no job entry in the waiting step of the above-mentioned S1, the main control section 20 determines whether or not a predetermined time has passed (S2). If the predetermined time has not passed in the decision step of S2, the main control section 20 returns again to the waiting step of S1, whereas causes the multifunctional printer 16 to switch over to the power saving mode if the predetermined time has passed (S3). Additionally, when the transition to the power saving mode is made, the feed of electricity to the main control section 20 is suspended, and the server 12 is notified by the subordinate control section 22 to the effect that the multifunctional printer 16 is to switch over to the power saving mode.

Figure 6:
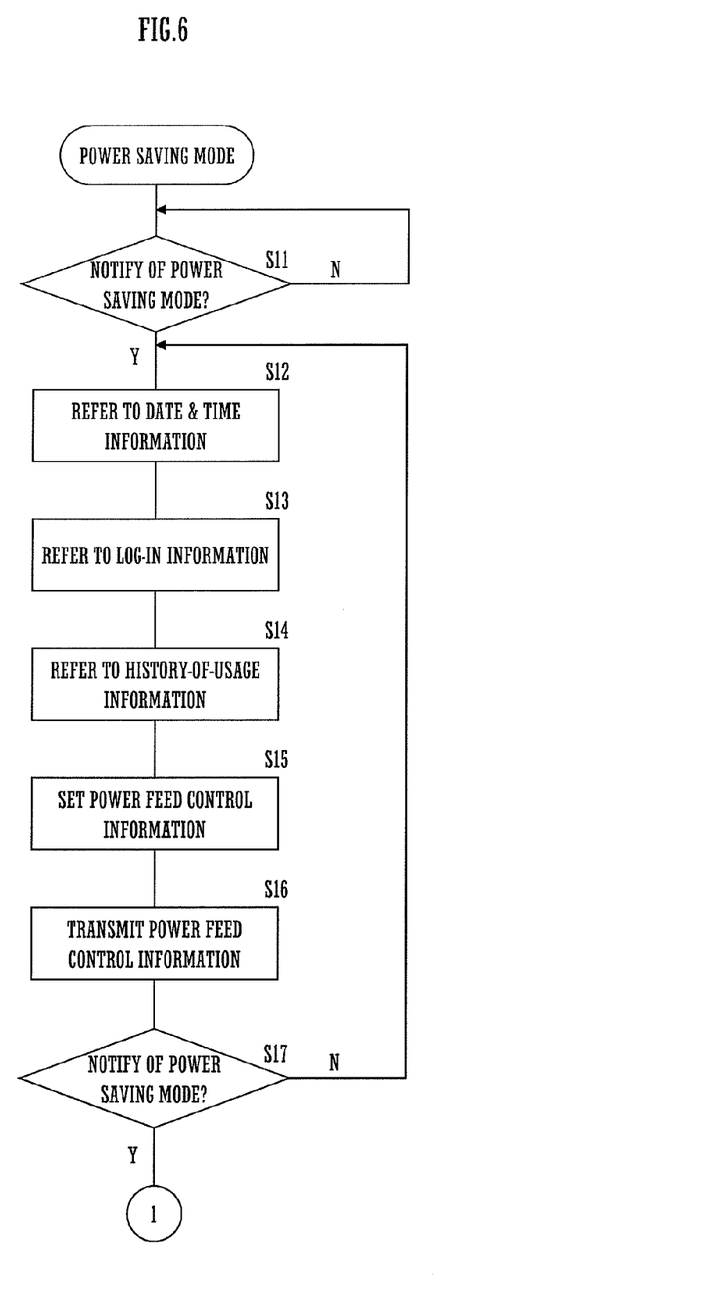
FIG. 6 is a flowchart showing an example of an operational procedure for the multifunctional printer in a power saving mode.

Subsequently, using FIG. 6, an example of an operational procedure for the CPU 122 of the server 12 is explained. The CPU 122 waits until it is notified from the multifunctional printer 16 that the latter is to switch over to the power saving mode (S11).

If there is the notification from the multifunctional printer 16 to the effect that it is to switch over to the power saving mode in the waiting step of S11, the CPU 122 acquires information on the date and time based on a built-in clock (S12).

Subsequently, the CPU 122 acquires information indicating current log-in states (S13). Then, the CPU 122 acquires information on the current date, time, and history-of-usage information associated with users currently logging in (S14).

In the history-of-usage information reference step of S14, the CPU 122 acquires, as shown in FIG. 7A, history-of-usage information associated with jobs operated by the users currently logging in a period from the day before backward to some predetermined days before (for example, 10 days before) and in a time zone that includes the current time. Shown in FIG. 7A is the history-of-usage information acquired in the state where the users A, C, E, F and G logged in at 10:30 a.m. of April 23.

However, method for the acquisition of the history-of-usage information is not limited to the same; a possible configuration may be such that other methods for the acquisition can be selected by a user's setting. For example, as shown in FIG. 7B, in the state where the users A, C, E, F and G logged in at 10:30 a.m. of April 23, the history-of-usage information associated with the jobs operated by the users A, C, E, F and G in a period from one week before backward to a predetermined weeks before (for example, 10 weeks before) and in a time zone of from 10:00 to 12:00 a.m. may be acquired. For example, if there is a different job tendency depending on days of a week, it is recommended to select the method for the acquisition shown in FIG. 7B.

Subsequently, the CPU 122, based on the acquired history-of-usage information, produces a piece of power feed control information to be applied to the operation panel 38, the image forming unit 40, the scanner unit 42 and the fax unit 44 (S15).

In the power feed control information producing step of S15, the CPU 122 calculates a past mean number of sheets on jobs of each function from the acquired history-of-usage information, and turns on any function of which mean number of sheets is not less than a threshold value for the mean number of sheets in the power saving mode.

Here, the past mean number of sheets is calculated based on data of the past X days in the same time zone (or data of the past X weeks in the same day of week and in the same time zone). With the acquired X pieces of data, a total sum of the number of times each function of the multifunctional printer was used is calculated with respect to the users who logged in in a time zone, and then a value obtained by dividing the total sum by X is used as a past mean number of sheets in the time zone.

Figure 8:
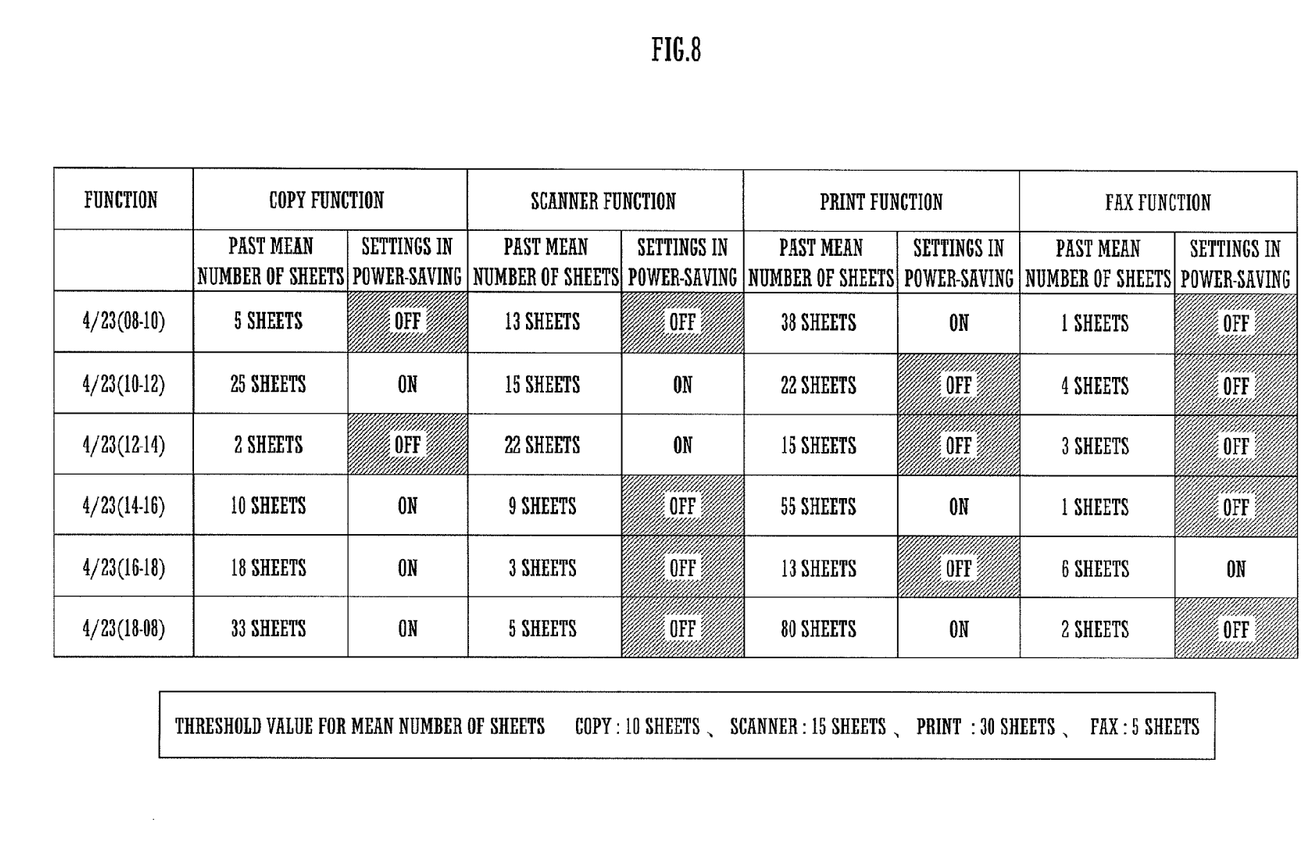
FIG. 8 is a diagram showing an example of an on-off control of each function.

In an example shown in FIG. 8, because the threshold values for the mean number of sheets are respectively preset to 10 sheets for the copy function, 15 sheets for the scanner function, 30 sheets for the print function and 5 sheets for the fax function, in a time zone in which a past mean number of sheets is not less than the threshold value, a piece of power feed control information is produced such that a corresponding function is kept turned on even when the multifunctional printer 16 switches over to the power saving mode.

On the other hand, if a calculated mean number of sheets is less than the threshold value for the mean number of sheets, a piece of power feed control information is produced such that a corresponding function is turned off when the multifunctional printer 16 switches over to the power saving mode.

For example, at 10:30 a.m. of April 23, the copy function and the scanner function are turned on since their respective past mean numbers of sheets are not less than the respective threshold values for the mean number of sheets, whereas the print function and the fax function are turned off since their respective past mean numbers of sheets are less than the respective threshold values for the mean number of sheets.

If a piece of power feed control information is produced in the power feed control information producing step of S15, the CPU 122 transmits the produced power feed control information to the multifunctional printer 16 (S16).

Thereafter, the CPU 122 repeats the steps of S12 through S16 until being notified by the multifunctional printer 16 that it returned to the normal mode, and stops the power feed control process performed in the power-saving when being notified by the multifunctional printer 16 that it returned to the normal mode (S17).

Figure 9:
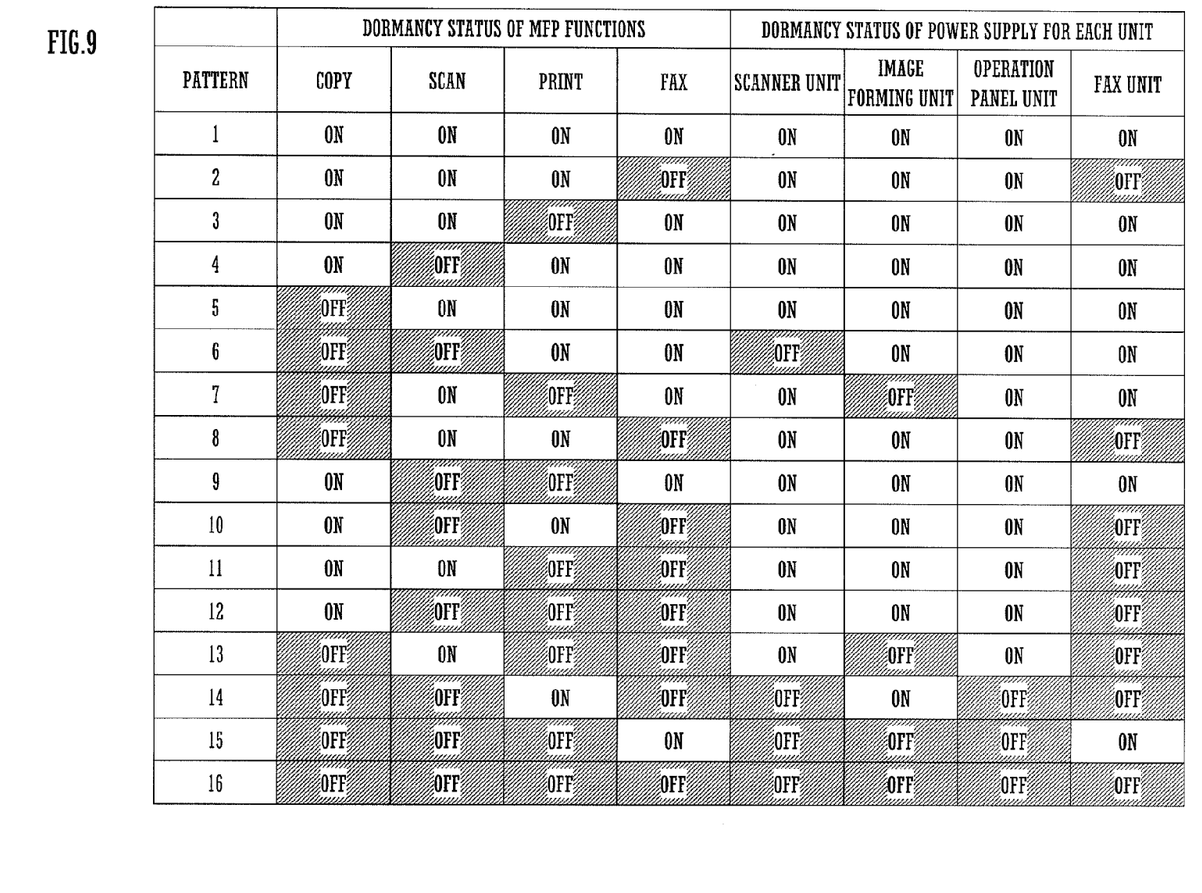
FIG. 9 is a diagram showing an example of an on-off control of each functional unit.

On the other hand, in the multifunctional printer 16, the subordinate control section 22 controls the power feed control section 36 based on the power feed control information received from the server 12, thereby performing a power feed control to the operation panel 38, the image forming unit 40, the scanner unit 42 and the fax unit 44. Then, preferably the subordinate control section 22 may refer to a look-up table as shown in FIG. 9 indicating a correspondence between a piece of power feed control information and on/off switching-over settings of the operation panel 38, the image forming unit 40, the scanner unit 42 and the fax unit 44.

Further, in the above-mentioned step of S1, it is recommended for the personal computers 14 of the image forming system 10 to bear an increased waiting time before the power saving mode transition control starts depending on the increase in the number of users who are logging in.

The above-mentioned configuration makes it possible to perform a control such that any functional unit that is not expected to be used with a high probability is caused to switch over to the power saving mode while any other functional unit that is expected to be used with a high probability is not caused to switch over to the power saving mode, based on a history of past usage of the multifunctional printer 16 by users currently logging in.

Accordingly, frequent occurrences of the inconvenience that a time loss occurs because a functional unit a user is going to use has been switched over to the power saving mode and the inconvenience that any other functional unit the users are not using is left without being switched over to the power saving mode can be prevented surely. As a result, it is made possible to perform a control of the feed of electricity to each functional unit of the multifunctional printer 16 without deteriorating the convenience of users nor decreasing the power saving effect.

Although an example has been explained in the above-mentioned embodiment in which the server 12 produces the power feed control information, instead the subordinate control section 22 of the multifunctional printer 16 may produce the power feed control information based on information from server 12.

Figure 10:
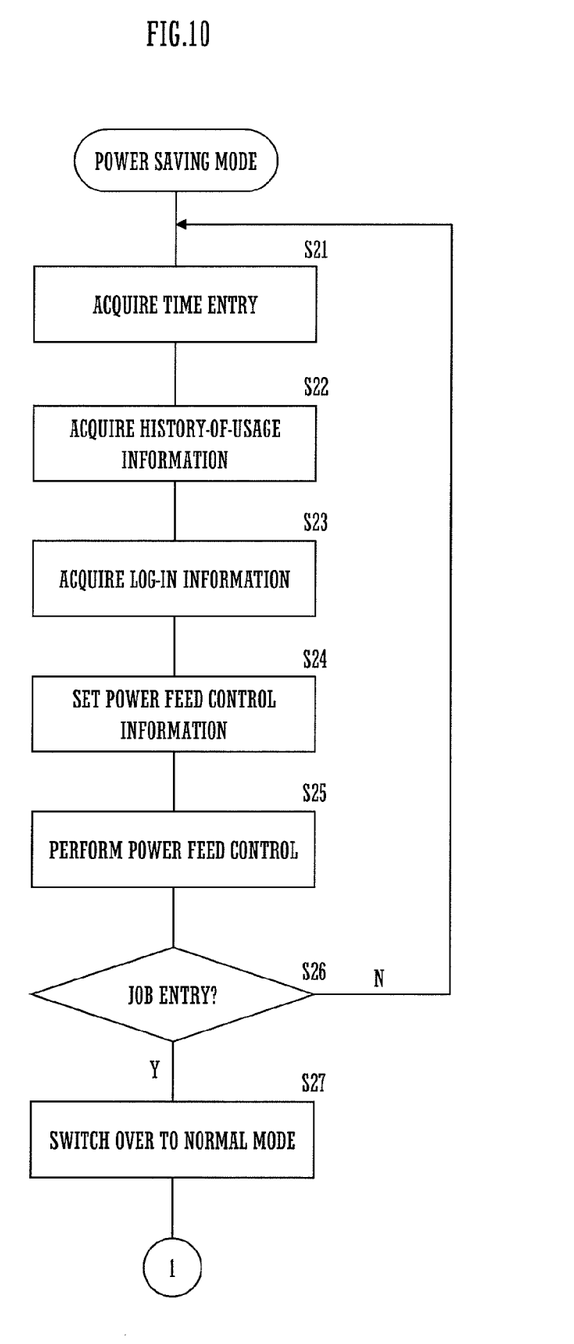
FIG. 10 is a flowchart showing another example of an operational procedure for the multifunctional printer in the power saving mode.

Now, using FIG. 10, an example is briefly explained in which the subordinate control section 22 of the multifunctional printer performs a control of the feed of electricity to each functional unit. First, in the power saving mode, the subordinate control section 22 acquires time entry (here, date and time) from a built-in timer (S21). Then, the subordinate control section 22 acquires the history-of-usage information from the server 12 (S22). After that, the subordinate control section 22 acquires the log-in information from the server 12 (S23).

Then, the subordinate control section 22 produces a piece of power feed control information according to the same method as the above-mentioned step of S15 (S24), and performs a power feed control to each functional unit of the multifunctional printer 16 based on the produced power feed control information (S25).

The steps of S21 through S25 are repeated until a job entry is made to the multifunctional printer 16 (S26). If a job entry is made to the multifunctional printer 16 in the decision step of to S26, the subordinate control section 22 causes the main control section 20 to start, and causes the multifunctional printer 16 to switch over to the normal mode (S27).

Although an example has been explained in the above-mentioned embodiment in which one multifunctional printer 16 is disposed in one local network, the technical thought of the present invention can be exploited even in cases where the number of the multifunctional printers 16 disposed in the network is not less than 2. In such cases, for example, it is recommended that the server 12 records the history-of-usage information on each of the multifunctional printers 16 separately.

Figure 11:
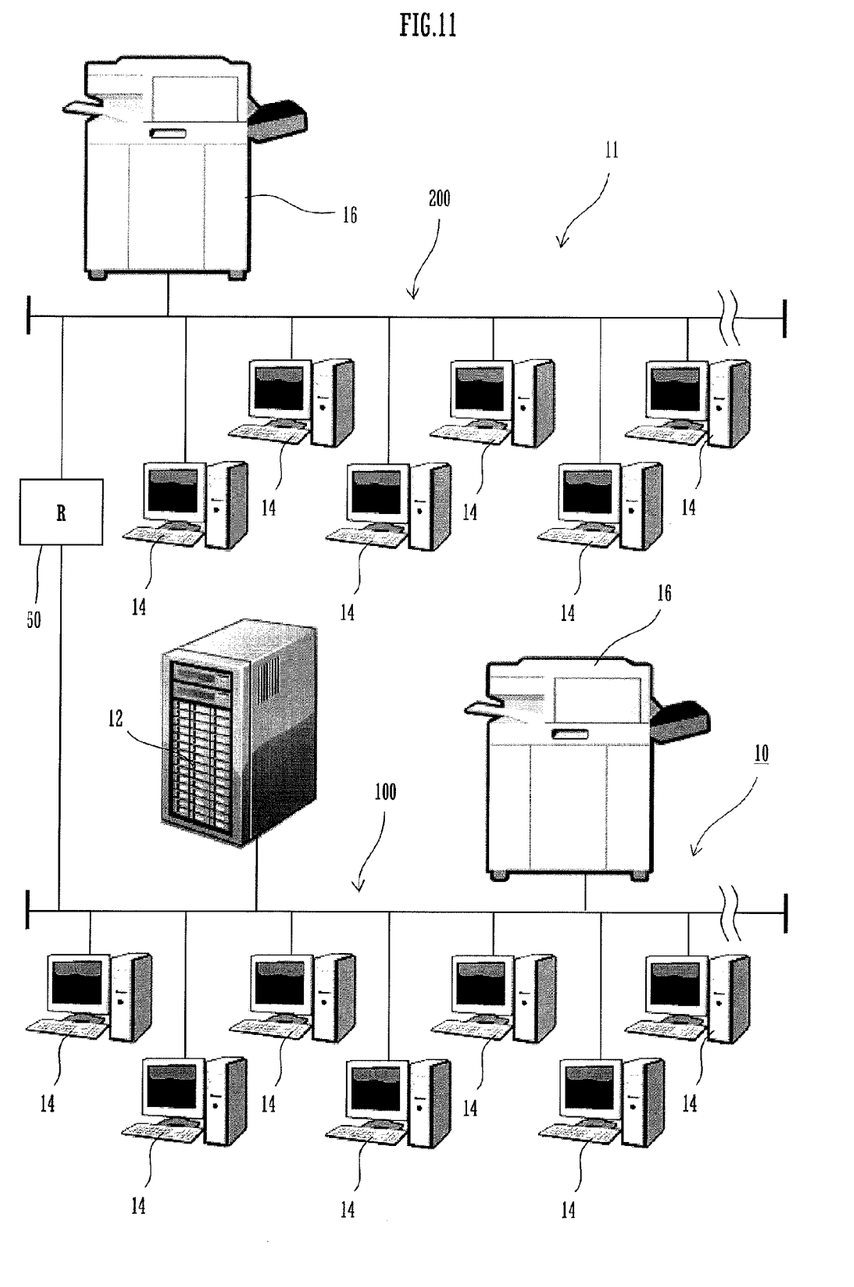
FIG. 11 is a diagram showing an outline of another example of an image forming system.

Further, as shown in FIG. 11, the technical thought of the present invention is applicable even to a case where a multifunctional printer 16 is disposed in each of a plurality of networks 10, 11 that are connected to each other through router(s) 50. In such case, for example, it is recommended that the server administers the log-in information of users on each of the networks separately.

Although an example has been explained in the above-mentioned embodiment in which a day is divided into six time zones, it is also possible to employ any of other dividing methods such as dividing time zones into 1-hour units, 2-hour units, 6-hour units, a.m.-p.m. units or the like.

Further, although the functional units has been explained as to the operation panel 38, the image forming unit 40, the scanner unit 42 and the fax unit 44, it is also possible to add other functional units such as finisher like a staple apparatus, automated document conveying device and so forth to the functional units to perform the power feed control of independently.

Moreover, instead of the on/off control of the power feeding to each of the functional units, a multi-stepwise control of power feeding amount to each of the functional units may be employed.

Although it has been explained in the above-mentioned embodiment that job transmissions (print job) to the multifunctional printer 16 are made from the personal computers 14 by the notification program 156 in each of the personal computers 14, the job transmissions may be made to the server 12 instead. After a job transmission has been made to the server 12, the authentication of a user is performed using the authentication program 262 in the multifunctional printer 16, and then a decision can be made as to whether to perform a printing by transmitting the job data from the server 12 to the multifunctional printer 16 (when the printing was performed, its history of usage is stored in the server 12) or to delete the job data itself.

Or, it may be employed that a destination of the job transmission is the multifunctional printer 16 and that the decision is made there as to whether to perform a printing or to delete the job data itself. If the printing was performed, its history of usage is transmitted to the server 12 using the notification program 264.

The above explanation of the embodiment is nothing more than illustrative in any respect, nor should be thought of as restrictive. Scope of the present invention is indicated by claims rather than the above embodiment. Further, it is intended that any changes that are equivalent to a claim in the sense and realm of the doctrine of equivalence be included within the scope of the present invention.

REFERENCE SIGNS LIST

10—Image forming system
12—Server
14—Personal computer
16—Multifunctional printer
20—Main control section
22—Subordinate control section
34—Power-supply unit
36—Power feed control section
38—Operation panel
40—Image forming section
42—Scanner unit
44—Fax unit

The invention claimed is:

1. An image forming system including an image forming apparatus having a plurality of functional units and capable of controlling transition to a power saving mode for each functional unit while being in a power saving mode, the image forming system comprising:
a single or a plurality of operation terminal units each having an authentication function and capable of outputting a job run command to the functional units based on an operation of a user permitted to log in through the authentication;
an operating means installed in the image forming apparatus, the operating means having an authentication function and capable of outputting a job run command to the functional units based on an operation of a user permitted to log in through the authentication;
a history information recording section recording a job history of the plurality of functional units associating the job history with the users who caused the respective job run commands to be outputted;
a state administering section administering log-in states at the operation terminal units; and
a power feed control section setting one or more functional units that are determined to be switched over to the power saving mode from among the plurality of functional units based on time entry, the log-in states and recorded content of the history information recording section, wherein the power feed control section sets one or more functional units that are determined to be switched over to the power saving mode from among the plurality of functional units based on a job history associated with all of users who are logging in.

2. The image forming system as claimed in claim 1, wherein the power feed control section, based on a job history in a plurality of past days associated with all of users who are logging in and in the same time zone as the current log-in, causes each of the functional units of which mean value of the number of jobs within the time zone does not reach a predetermined value to switch over to the power saving mode.

3. An image forming system including an image forming apparatus having a plurality of functional units and capable of controlling transition to a power saving mode for each functional unit while being in a power saving mode, the image forming system comprising:
a single or a plurality of operation terminal units each having an authentication function and capable of outputting a job run command to the functional units based on an operation of a user permitted to log in through the authentication;
an operating means installed in the image forming apparatus, the operating means having an authentication function and capable of outputting a job run command to the functional units based on an operation of a user permitted to log in through the authentication;
a history information recording section recording a job history of the plurality of functional units associating the job history with the users who caused the respective job run commands to be outputted;
a state administering section administering log-in states at the operation terminal units;
a power feed control section setting one or more functional units that are determined to be switched over to the power saving mode from among the plurality of functional units based on time entry, the log-in states and recorded content of the history information recording section, wherein the power feed control section sets one or more functional units that are determined to be switched over to the power saving mode from among the plurality of functional units based on a job history associated with all of users who are logging in; and
a server connected to the image forming apparatus and each of the operation terminal units through a network, wherein
the history information recording section and the state administering section are provided in the server.

4. An image forming system including an image forming apparatus having a plurality of functional units and capable of controlling transition to a power saving mode for each functional unit while being in a power saving mode, the image forming system comprising:
a single or a plurality of operation terminal units each having an authentication function and capable of outputting a job run command to the functional units based on an operation of a user permitted to log in through the authentication;

an operating means installed in the image forming apparatus, the operating means having an authentication function and capable of outputting a job run command to the functional units based on an operation of a user permitted to log in through the authentication;

a history information recording section recording a job history of the plurality of functional units associating the job history with the users who caused the respective job run commands to be outputted;

a state administering section administering log-in states at the operation terminal units; and a power feed control section setting one or more functional units that are determined to be switched over to the power saving mode from among the plurality of functional units based on time entry, the log-in states and recorded content of the history information recording section, wherein the power feed control section sets one or more functional units that are determined to be switched over to the power saving mode from among the plurality of functional units based on a job history associated with all of users who are logging in, wherein waiting time is increased before a power saving mode transition control starts depending on the increase in the number of users who are logging in.

5. An image forming apparatus having a plurality of functional units and capable of controlling transition to a power saving mode for each functional unit while being in a power saving mode, the image forming apparatus comprising:

a means of communications communicable with a single or a plurality of operation terminal units each having an authentication function and capable of outputting a job run command to the functional units based on an operation of a user permitted to log in through the authentication;

an operating means installed in the image forming apparatus, the operating means having an authentication function and capable of outputting a job run command to the functional units based on an operation of a user permitted to log in through the authentication;

a history information recording section recording a job history of the plurality of functional units associating the job history with the users who caused the respective job run commands to be outputted;

a state administering section administering log-in states at the operation terminal units; and a power feed control section setting, in the power saving mode, one or more functional units that are determined to be switched over to the power saving mode from among the plurality of functional units based on time entry, the log-in states and recorded content of the history information recording section, wherein the power feed control section sets one or more functional units that are determined to be switched over to the power saving mode from among the plurality of functional units based on a job history associated with all of users who are logging in.

6. An image forming apparatus having a plurality of functional units and capable of controlling transition to a power saving mode for each functional unit while being in a power saving mode, the image forming apparatus comprising:

a means of communications communicable with a single or a plurality of operation terminal units each having an authentication function and capable of outputting a job run command to the functional units based on an operation of a user permitted to log in through the authentication;

an operating means installed in the image forming apparatus, the operating means having an authentication function and capable of outputting a job run command to the functional units based on an operation of a user permitted to log in through the authentication;

a history information recording section recording a job history of the plurality of functional units associating the job history with the users who caused the respective job run commands to be outputted;

a state administering section administering log-in states at the operation terminal units; and a power feed control section setting, in the power saving mode, one or more functional units that are determined to be switched over to the power saving mode from among the plurality of functional units based on time entry, the log-in states and recorded content of the history information recording section, wherein the power feed control section sets one or more functional units that are determined to be switched over to the power saving mode from among the plurality of functional units based on a job history associated with all of users who are logging in, wherein waiting time is increased before a power saving mode transition control starts depending on the increase in the number of users who are logging in.

* * * * *